(12) United States Patent
Bergström et al.

(10) Patent No.: US 10,492,113 B2
(45) Date of Patent: Nov. 26, 2019

(54) MOBILITY PROCEDURES BETWEEN BEAMS FROM DIFFERENT RADIO NETWORK NODES

(71) Applicant: Telefonaktiebolaget LM Ericsson (publ), Stockholm (SE)

(72) Inventors: Andreas Bergström, Linköping (SE); Peter Alriksson, Hörby (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 84 days.

(21) Appl. No.: 15/757,142

(22) PCT Filed: Sep. 2, 2015

(86) PCT No.: PCT/SE2015/050926
§ 371 (c)(1),
(2) Date: Mar. 2, 2018

(87) PCT Pub. No.: WO2017/039505
PCT Pub. Date: Mar. 9, 2017

(65) Prior Publication Data
US 2018/0279189 A1    Sep. 27, 2018

(51) Int. Cl.
*H04W 36/00* (2009.01)
*H04B 7/024* (2017.01)
(Continued)

(52) U.S. Cl.
CPC ........ *H04W 36/0083* (2013.01); *H04B 7/024* (2013.01); *H04B 7/0695* (2013.01);
(Continued)

(58) Field of Classification Search
CPC ..... H04B 7/024; H04B 7/0695; H04W 16/28; H04W 36/0072; H04W 36/0083; H04W 36/00835; H04W 36/08; H04W 36/30
See application file for complete search history.

(56) References Cited

U.S. PATENT DOCUMENTS

2013/0051364 A1*  2/2013  Seol ............... H04W 16/28
                                              370/331
2014/0334566 A1   11/2014  Kim et al.
(Continued)

FOREIGN PATENT DOCUMENTS

EP           2928235 A1    10/2015
KR      20140076509 A       6/2014
(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.4.0, Dec. 2014, 1-251.
(Continued)

*Primary Examiner* — Kashif Siddiqui
(74) *Attorney, Agent, or Firm* — Murphy, Bilak & Homiller, PLLC

(57) ABSTRACT

Embodiments herein relate to a method performed by a second radio network node (13) for enabling a mobility procedure of a wireless device (10) between a first radio network node (12) and the second radio network node in a wireless communication network (1). The second radio network node (13) determines an active set of beams used at the second radio network node for connected wireless devices, and the second radio network node (13) transmits an indication to the first radio network node (12). The indication indicates the determined active set of beams. The active set of beams is used in the mobility procedure of the wireless device (10).

14 Claims, 9 Drawing Sheets

(51) Int. Cl.
- *H04B 7/06* (2006.01)
- *H04W 36/30* (2009.01)
- *H04W 16/28* (2009.01)
- *H04W 36/08* (2009.01)

(52) U.S. Cl.
CPC . *H04W 36/0072* (2013.01); *H04W 36/00835* (2018.08); *H04W 36/30* (2013.01); *H04W 16/28* (2013.01); *H04W 36/08* (2013.01)

(56) References Cited

U.S. PATENT DOCUMENTS

| | | | |
|---|---|---|---|
| 2015/0103784 A1* | 4/2015 | Lorca Hernando | H04L 5/0032 370/329 |
| 2015/0222345 A1 | 8/2015 | Chapman et al. | |
| 2015/0372730 A1* | 12/2015 | Dinan | H04B 7/0456 370/329 |
| 2017/0214444 A1* | 7/2017 | Nigam | H04B 7/0634 |

FOREIGN PATENT DOCUMENTS

| | | |
|---|---|---|
| WO | 2014036150 A1 | 3/2014 |
| WO | 2014074894 A1 | 5/2014 |
| WO | 2015080645 A1 | 6/2015 |
| WO | 2015109153 A1 | 7/2015 |

OTHER PUBLICATIONS

Sung, Nak W. et al., "Contention Based Fast Beam Switching Scheme in Millimeter-wave Cellular Systems", ICACT 2015, Jul. 1-3, 2015, 502-505.

* cited by examiner

MOBILITY PROCEDURES BETWEEN BEAMS FROM DIFFERENT RADIO NETWORK NODES

TECHNICAL FIELD

Embodiments herein relate to a first radio network node, a second radio network node and methods performed therein for wireless communication. In particular, embodiments herein relate to enabling a mobility procedure of a wireless device between the first radio network node and the second radio network node in a wireless communication network.

BACKGROUND

In a typical wireless communication network, wireless devices, also known as wireless communication devices, mobile stations, stations (STA) and/or user equipments (UE), communicate via a Radio Access Network (RAN) to one or more core networks. The RAN covers a geographical area which is divided into service areas or cell areas, with each service area or cell area being served by an access node e.g. a radio network node such as a radio access node e.g., a Wi-Fi access point or a radio base station (RBS), which in some networks may also be denoted, for example, a "NodeB" or "eNodeB". The area or cell area is a geographical area where radio coverage is provided by the access node. The access node communicates over an air interface operating on radio frequencies with the wireless device within range of the access node.

A Universal Mobile Telecommunications System (UMTS) is a third generation telecommunication network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks and UTRAN specifically, and investigate enhanced data rate and radio capacity. In some RANs, e.g. as in UMTS, several access nodes may be connected, e.g., by landlines or microwave, to a controller node, such as a radio network controller (RNC) or a base station controller (BSC), which supervises and coordinates various activities of the plural access nodes connected thereto. This type of connection is sometimes referred to as a backhaul connection. The RNCs are typically connected to one or more core networks.

Specifications for the Evolved Packet System (EPS) have been completed within the 3$^{rd}$ Generation Partnership Project (3GPP) and this work continues in the coming 3GPP releases. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access technology wherein the access nodes are directly connected to the EPC core network rather than to RNCs. In general, in E-UTRAN/LTE the functions of an RNC are distributed between the access nodes, e.g. eNodeBs in LTE, and the core network. As such, the RAN of an EPS has an essentially "flat" architecture comprising access nodes connected directly to one or more core networks, i.e. they are not connected to RNCs. To compensate for that, the E-UTRAN specification defines a direct interface between the access nodes, this interface being denoted the X2 interface.

Of the upcoming fifth generation of wireless communication networks 5G, one key design principle currently under consideration is to base the wireless communication network on an ultra-lean design. This implies that "always on signals" from the network should be avoided as much as possible. The expected benefits from this design principle are that the wireless communication network should have a significantly lower network energy consumption, a better scalability, a higher degree of forward compatibility during a Radio Access Technology (RAT) evolution phase, a lower interference from system overhead signals and consequently a higher throughput in low load scenario, and an improved support for user centric beam-forming.

There are principally two sets of mobility procedures considered in both the current LTE standard as well as in the ongoing 5G discussions.

The first set of mobility procedures is denoted 'Idle Mode Mobility' and defines how a wireless device which is deemed 'Idle', i.e. the wireless device has no ongoing nor a recent data transfer, shall be able to reach the wireless communication network using random access procedures and how to be reachable from the wireless communication network by means of paging procedures etc. In idle mode, the mobility procedures, such as a handover, cell selections or cell reselections, are typically controlled by the wireless device based on a set of rules, e.g. signal level thresholds and carrier frequency priorities, decided by the wireless communication network.

The other set of mobility procedures is 'Active Mode Mobility', which has a main task of maintaining the connectivity for an 'Active' or 'Connected' wireless device, i.e. the wireless device actually has an ongoing or a recent data transfer, as the wireless device moves around in the wireless communication network, and also to handle abnormal cases such as failed handovers, radio link failures etc. In 'Active Mode Mobility' the mobility procedures are typically controlled by the wireless communication network, potentially based on measurements from the wireless device.

A complete X2-based intra-Mobility Management Entity (MME)/intra Serving Gateway (S-GW) Handover (HO) procedure for an LTE system is given in 3GPP TS 36.300 "E-UTRA(N) Overall Description; Stage 2" version: V12.4.0 (2014 December).

A key difference between the current LTE mobility procedures as per above, and the upcoming 5G mobility procedures, is that in an ultra-lean system as 5G, as described above, the radio network nodes will prevent themselves from keeping some of the 'always-on' signal unlike their counter parts in the LTE system. Instead, the wireless communication network needs to activate the necessary reference signals or beams to measure on only when needed.

The term 'beam' used herein is defined in relation with a reference signal (RS). That is, from the wireless device's standpoint a beam is considered as an entity that the wireless device may associate with and is recognized via some reference signals specific to that beam which, in the case of a legacy LTE network, may be the Cell-specific Reference Signals (CRS) of the cell or UE specific reference signals for a specific wireless device. In a wireless communication network with more than one antenna, it is possible for the wireless communication network to form directive antenna radiation patterns, a process which is most often related to as beam-forming. In future wireless communication systems with a large number of antennas, this beam-forming may be very directive and hence provide a very high antenna beamforming gain. In such beam-forming cases, there may be other types of reference signals present, here called simply Beam Reference Signals (BRS) or Mobility Reference Signals (MRS). In all essence however, regardless of the level of directivity of the formed antenna pattern, it is still considered a 'beam'. Hence, for the simplicity of the exposition, the term 'beam' will be used herein.

A service area of a radio network node is a region surrounding the radio network node in which the radio network node is responsible for the active mode mobility related measurements from the wireless device. A wireless device outside such a service area could still be served by the beams from the radio network node but a neighbor radio network node providing radio coverage will be ideally suited for mobility related aspects for the wireless device. Also, such a service area could be a virtual region or could be defined by certain reference signals' coverage. Hence, this 5G concept of service area may be resembled to the coverage area/cell concept of a current LTE system, which has no counterpart in a massively beam-formed system without cell-specific reference symbols being always on.

As stated earlier above, the radio network nodes will prevent themselves from keeping some of the 'always-on' signals in order to facilitate mobility for a wireless device being in active mode. Instead, a serving radio network node needs to activate these reference signals at a target radio network node to measure on at the time of handovers. One way of providing such a mechanism is via a position-to-MRS table mapping, wherein an MRS is the reference signal that the wireless device measures on related to a given beam. The position could refer to a geographical position or a so-called 'radio position' of the wireless device. The term 'radio position' used here could for example be a set of measured quantities such as angle of arrival or experienced path loss of transmissions from the wireless device or signal strength measurements of transmission to the wireless device, in other words a sort of fingerprinting of the radio environment. It could also be based on actively transmitted signals/beacons from some radio network nodes in, or outside, the wireless communication network.

As proposed already, the source radio network node may ask its neighbor radio network nodes to transmit MRS for beams when the source radio network node deems it relevant to do a handover for one or more of its served wireless devices. One such scenario is shown in FIG. 1, where a left radio network node, eNB1, is serving one wireless device, W1, and a right radio network node, eNB2, is serving two other wireless devices, W2, W3,—each in a separate beam. The right radio network node eNB2 is also transmitting one additional MRS/beam in order to facilitate HO for one of the wireless devices it is serving itself—this is however something that is unknown to the left radio network node eNB1. Now, se FIG. 2, the eNB1 may initiate a HO procedure towards the eNB2 for the wireless device W1 served at the eNB1, whereby it will request, with a reference signal request, the eNB2 to start transmitting one or more RSs or beams that can be used for HO related measurements by the wireless device W1 to support the HO procedure, see action 1a. The eNB2 starts the RSs or beams, action 1b in the FIG. 2. Action 1c. The eNB1 sends the wireless device, W1, some measurement control information for enabling measurements. Action 2. The wireless device W1 reports back to the eNB1 with measurement reports. Action 3. The eNB1 makes a HO decision based on the received measurement reports. In case a HO is decided, the eNB1 transmits a handover request to the eNB2, see Action 4. Action 5. The eNB2 performs an admission control and in case the admission control is successful, the eNB2 sends a handover request acknowledgement (Ack) to the eNB1, see Action 6.

This will require resources for signaling and handling the request from the eNB1, leading to an inefficient mobility procedure.

SUMMARY

An object of embodiments herein is to provide a mechanism for enabling mobility procedures in a wireless communication network in an efficient manner.

According to an aspect the object is achieved by a method performed by a second radio network node for enabling a mobility procedure of a wireless device between a first radio network node and the second radio network node in a wireless communication network. The second radio network node determines an active set of beams used at the second radio network node for connected wireless devices, and the second radio network node transmits an indication to the first radio network node. The indication indicates the determined active set of beams. The active set of beams is used in the mobility procedure of the wireless device.

According to another aspect the object is achieved by a method performed by a method performed by a first radio network node for enabling a mobility procedure of a wireless device between the first radio network node and a second radio network node in a wireless communication network. The first radio network node receives an indication from the second radio network node, which indication indicates an active set of beams used at the second radio network node for connected wireless devices at the second radio network node. The first radio network node transmits measurement information to the wireless device indicating one or more beams in the active set of beams to perform a measurement on, which measurement information is used in the mobility procedure of the wireless device.

According to yet another aspect the object is achieved by providing a second radio network node for enabling a mobility procedure of a wireless device between a first radio network node and the second radio network node in a wireless communication network. The second radio network node is configured to determine an active set of beams used at the second radio network node for connected wireless devices. The second radio network node is further configured to transmit an indication to the first radio network node, which indication indicates the determined active set of beams and which active set of beams is used in the mobility procedure of the wireless device.

According to still another aspect the object is achieved by providing a first radio network node for enabling a mobility procedure of a wireless device between the first radio network node and a second radio network node in a wireless communication network. The first radio network node is configured to receive an indication from the second radio network node, which indication indicates an active set of beams used at the second radio network node for connected wireless devices at the second radio network node. The first radio network node is further configured to transmit measurement information to the wireless device indicating one or more beams in the active set of beams to perform a measurement on, which measurement information is used in the mobility procedure of the wireless device.

An advantage is that the first radio network node will benefit that it already knows that the second radio network node is transmitting one or more beams in the direction towards the first radio network node as indicated in the received indication. When this info is known, then the first radio network node may ask its served wireless device to do more measurements on this or these beams e.g. in order to enhance a table such as a position to beam mapping table. This may also improve a selection of correct beams as it can rely on longer measurement duration and requesting unnecessary activation of beams may be avoided. Hence, embodiments herein provide a mechanism for enabling mobility procedures in a wireless communication network in an efficient manner.

BRIEF DESCRIPTION OF THE DRAWINGS

Embodiments will now be described in more detail in relation to the enclosed drawings, in which.

DETAILED DESCRIPTION

Figure 1:
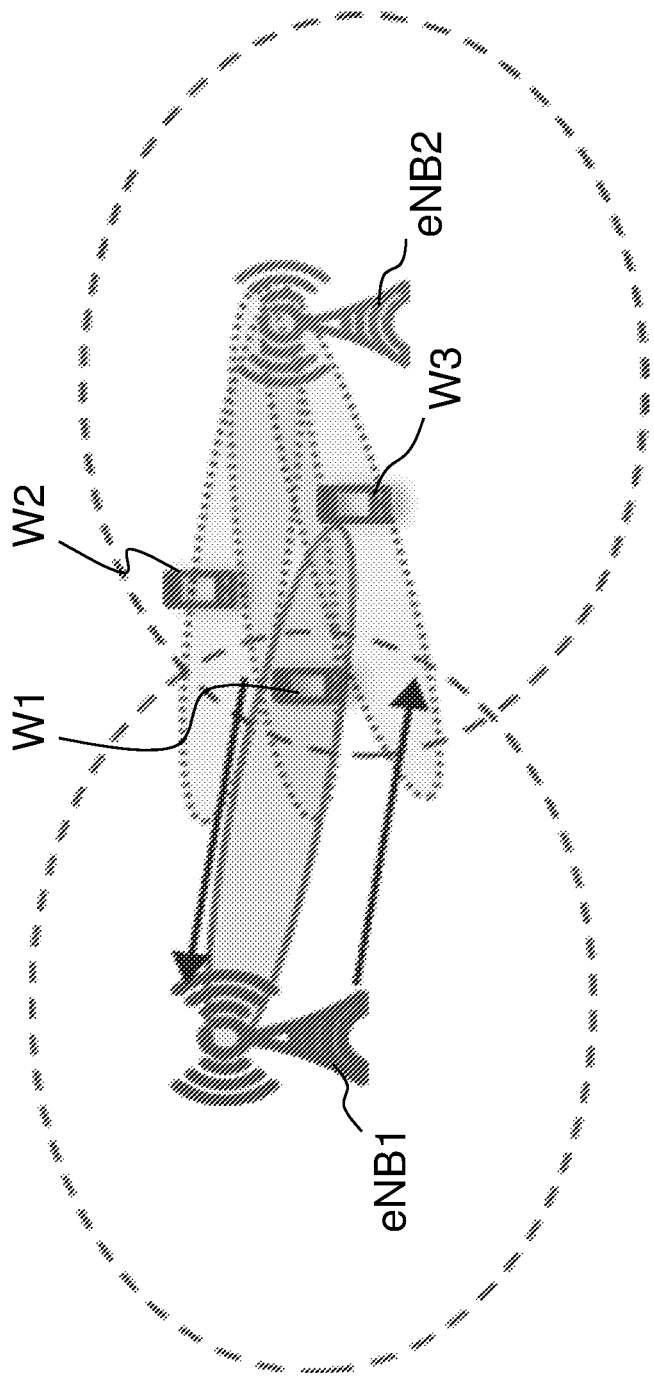
FIG. 1 is a schematic overview depicting a wireless communication network according to prior art.
Figure 2:
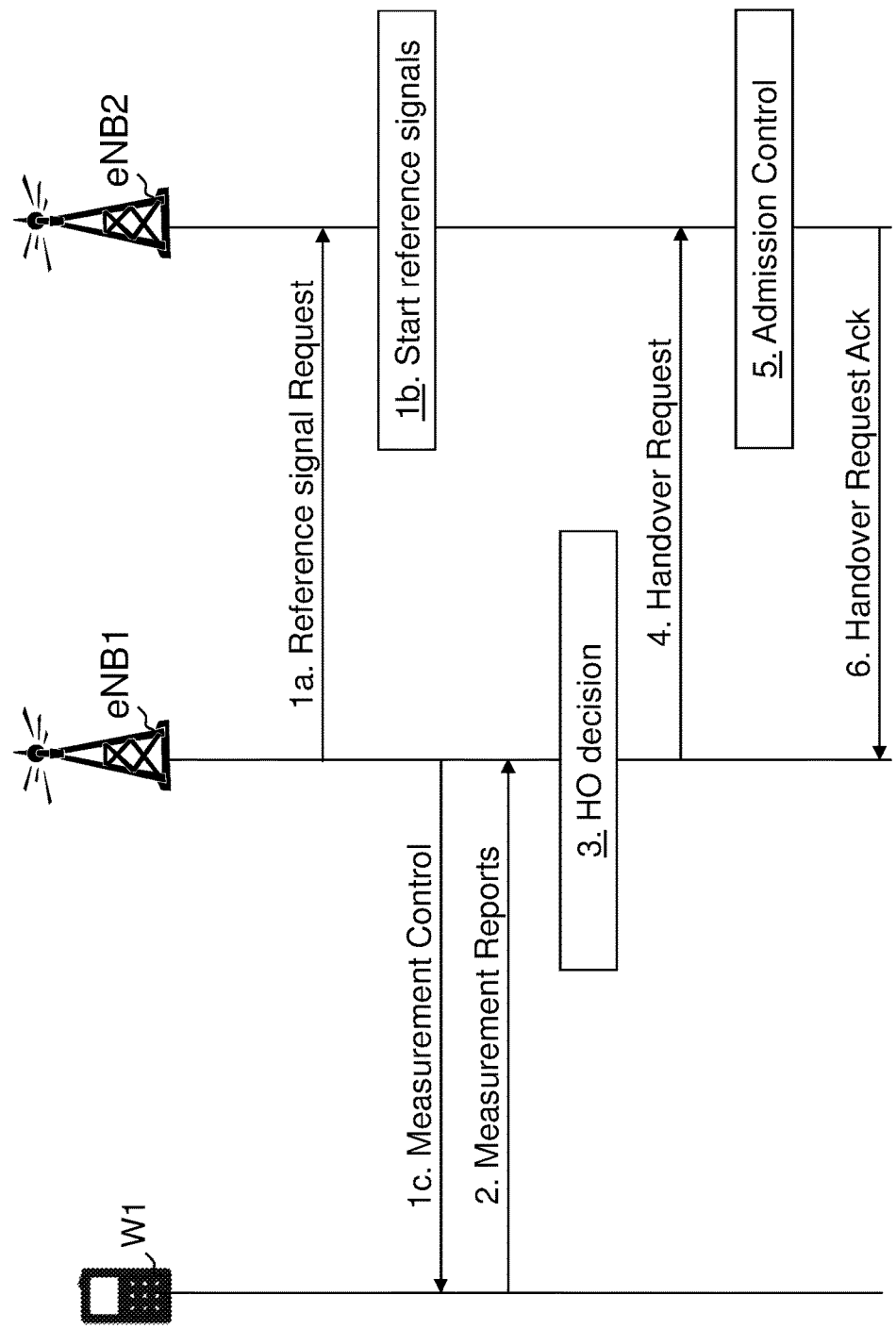
FIG. 2 is a combined signalling scheme and flowchart depicting a method according to prior art.
Figure 3:
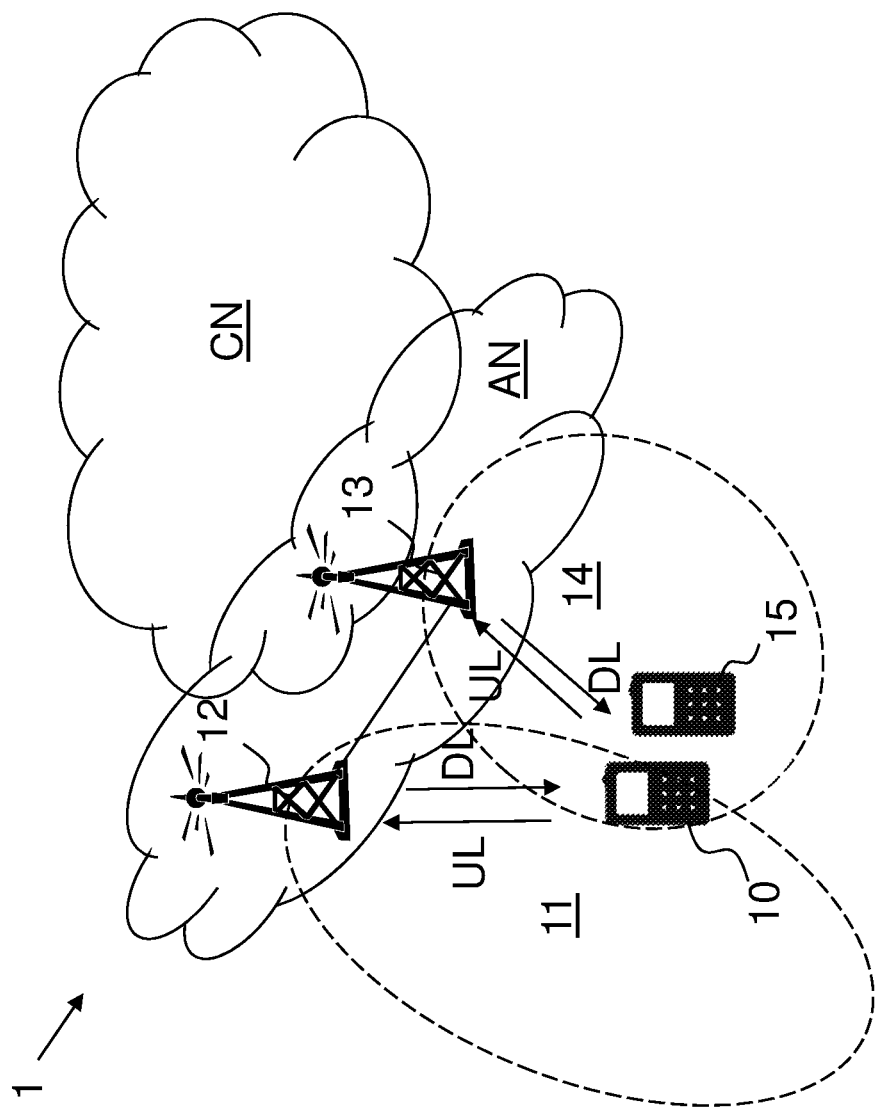
FIG. 3 is a schematic overview depicting a wireless communication network according to embodiments herein.

Embodiments herein relate to wireless communication networks in general. FIG. 3 is a schematic overview depicting a wireless communication network 1. The wireless communication network 1 comprises one or more RANs and one or more CNs. The wireless communication network 1 may use a number of different technologies, such as Wi-Fi, Long Term Evolution (LTE), LTE-Advanced, 5G, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are applicable also in further development of the existing wireless communication systems such as e.g. WCDMA and LTE.

In the wireless communication network 1, wireless devices e.g. a wireless device 10 such as a mobile station, a non-access point (non-AP) STA, a STA, a user equipment and/or a wireless terminals, communicate via one or more Access Networks (AN), e.g. RAN, to one or more core networks (CN). It should be understood by those skilled in the art that "wireless device" is a non-limiting term which means any terminal, wireless communication terminal, user equipment, Machine Type Communication (MTC) device, Device to Device (D2D) terminal, or node e.g. smart phone, laptop, mobile phone, sensor, relay, mobile tablets or even a base station communicating within a cell.

The wireless communication network 1 comprises a first radio network node 12 providing radio coverage over a geographical area, a first service area 11, of a first radio access technology (RAT), such as LTE, Wi-Fi or similar. The first radio network node 12 may be a radio network node such as an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of communicating with a wireless device within the service area served by the first radio network node 12 depending e.g. on the first radio access technology and terminology used. The first radio network node 12 may be referred to as source radio network node.

Furthermore, the wireless communication network 1 comprises a second radio network node 13 providing radio coverage over a geographical area, a second service area 14, of a second radio access technology, such as LTE, Wi-Fi, WiMAX or similar. The second radio network node 13 may be a radio network node such as an access point such as a WLAN access point or an Access Point Station (AP STA), an access controller, a base station, e.g. a radio base station such as a NodeB, an evolved Node B (eNB, eNodeB), a base transceiver station, Access Point Base Station, base station router, a transmission arrangement of a radio base station, a stand-alone access point or any other network unit capable of communicating with a wireless device within the service area served by the second radio network node 13 depending e.g. on the second radio access technology and terminology used. The first and second RAT may be the same or different RATs. The second radio network node 13 may be referred to as target radio network node. Additionally, a second wireless device 15 may be served by the second radio network node 13.

Embodiments herein involve the introduction of an 'active set of beams' for a radio network node, which one or more beams of the active set of beams at any given time are active in that radio network node. This may also be referred to as set of active beams. A given radio network node should know better of the current channel conditions in its served area, within its service area, cells, beams etc. than another radio network node can. According to embodiments herein each radio network node, e.g. the second radio network node 13, informs one or more of its neighboring radio network node/s regarding its active set of beams e.g. periodically and/or whenever there is a change in the active set of beams. That is, the second radio network node 13 determines the active set of beams used at the second radio network node 13 for connected wireless devices. Then the second radio network node 13 transmits an indication to the first radio network node 12. The indication indicates the determined active set of beams. The active set of beams is used in the mobility procedure of the wireless device 10.

Thereby the first radio network node 12 is more up to date on what potentially interfering beams are active in its neighboring nodes, such as the second radio network node 13. This may have the following advantages:

It helps the first radio network node 12 to more proactively configure the measurements of its served wireless devices to measure on the most relevant beams, even if these beams are originating from the second radio network node 13 rather than the serving first radio network node 12 itself.

The first radio network node 12 may also use this information to identify candidate beams in the second radio network node 13 to which a HO is more suited in the beams for the wireless device 10 in its service area and at a given position even when said candidate beams are turned off in the second radio network node 13. In other words, the first radio network node 12 may use this information to initialize and/or update the contents of its table comprising relations of radio network nodes and active set of beams e.g. a position-to-MRS table mapping.

It may reduce the probability of a drastic degradation in Signal to Interference plus Noise Ratio (SINR) for the wireless device 10 being served outside the first service area 11 of the first radio network node 12. This could happen in a situation when the second radio network node 13 activates a new beam to e.g. serve a new wireless device in its coverage region. By knowing this in advance, the first radio network node 12 can be more proactive and hence take appropriate decisions at an earlier stage.

Upon installation/relocation of the first radio network node 12 such as a base station, there is a need to build up a table comprising relations of the first radio network node 12 or actually positions within the first service area 11 of the first radio network node 12 and active set of beams from scratch. According to some embodiments herein, this procedure of building or maintaining the table, e.g. a position-MRS table, may be sped up by letting the newly installed first radio network node 12 to request the neighboring nodes, e.g. the second radio network node 13, to indicate their active beams proactively and vice versa. Upon generation of enough data to generate the table, this procedure could be halted and thereby signaling resources may be saved.

It may appear as if the exchange of the active set of beams between the radio network nodes may generate lots of signaling. This may indeed be true in some cases if e.g. every change in a beam within the beam-refinement procedure are part of the exchanged active set of beams. A much more likely scenario however, is that it is wider beams that are a part of the exchanged active set of beams. Since these are fewer in number and are expected not to change very often, then the signaling overhead should be quite limited-.

In case of a failed handover attempt towards a particular beam in the second radio network node 13, the first radio network node 12 may request the second radio network node 13 to proactively inform it on when this beam, nearby beams or even, if a really critical case in terms of a working connection is important, any beams are activated. Then the first radio network node 12 can also use this information to further refine the table.

Figure 4:
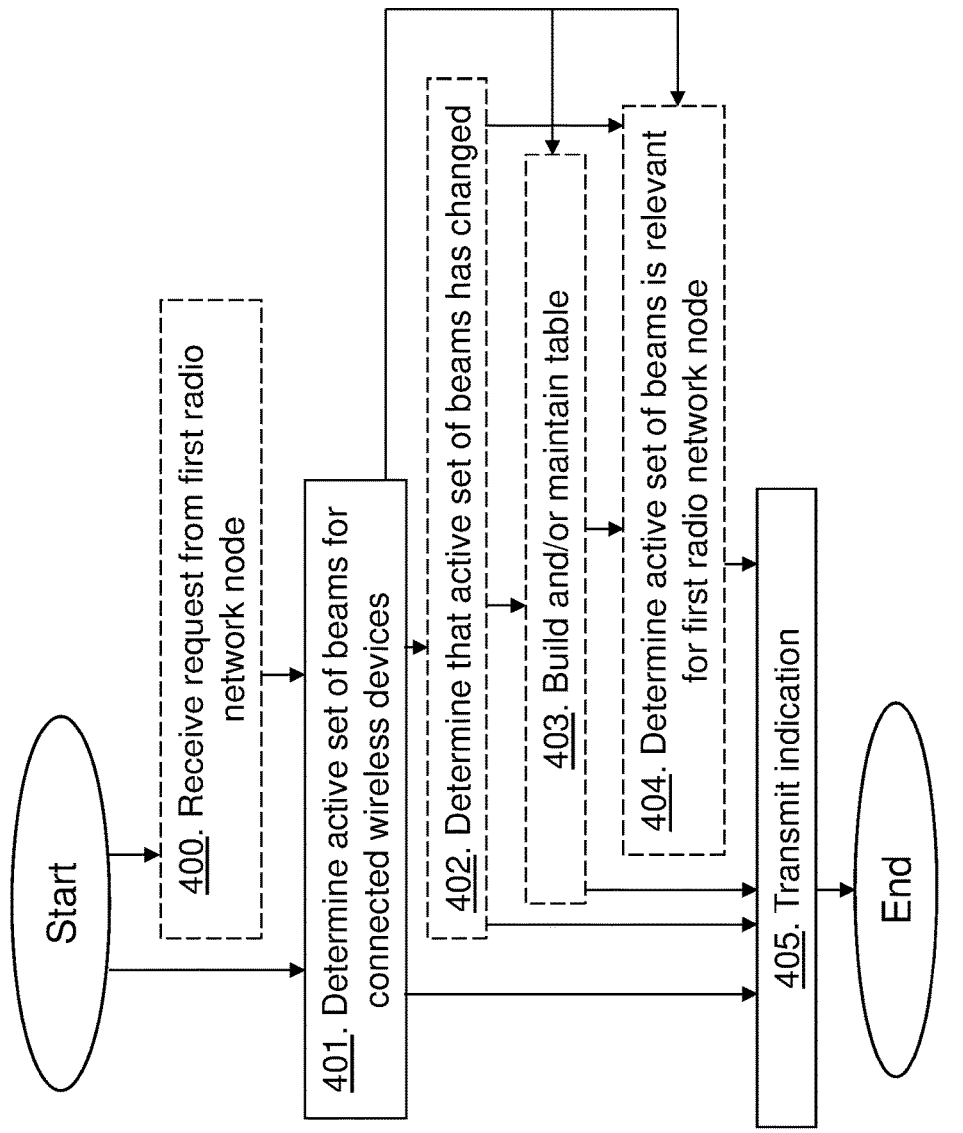
FIG. 4 is a flowchart depicting a method according to embodiments herein.

The method actions performed by the second radio network node 13 for enabling a mobility procedure of the wireless device 10 between the first radio network node 12 and the second radio network node 13 in the wireless communication network 1 according to some embodiments will now be described with reference to a flowchart depicted in FIG. 4. The actions do not have to be taken in the order stated below, but may be taken in any suitable order. Actions performed in some embodiments are marked with dashed boxes.

Action 400. The second radio network node 13 may receive a request from the first radio network node 12 for providing the indication of active set of beams.

Action 401. The second radio network node 13 determines an active set of beams used at the second radio network node 13 for connected wireless devices, e.g. the second wireless device 15.

Action 402. The second radio network node 13 may determine that the active set of beams has changed when there is a change in a property of any of the beams. In some embodiments beams will always have the same direction, precoding and power when powered on. I.e. it may only be changed in an on or off state. In some embodiments each beam may instead vary over time in a scenario where e.g. the second radio network node 13 alters the precoding and/or power of a given beam in order to 'track' the second wireless device 15 by means of so-called UE specific beamforming. In some embodiments related to such a scenario, the active set of beams will be consider to have changed and hence information need to be exchanged with the first radio network node 12 not only when a new beam has been activated or not, but also if e.g.: the second wireless device 15 has moved by more than a given (minimum) distance; the precoding has changed by more than a given (minimum) amount; the power of the beam has changed by more than a given (minimum) amount; and similar. Obviously, this is a non-exhaustive list, whereby other possibilities also exist.

Action 403. The second radio network node 13 may build and/or maintain a table, which table comprises relations of radio network nodes and active set of beams. E.g. the table may be built/maintained from received/sent indications of relevant beams for certain positions in the first/second radio network node. The indication may be received from within, the first radio network node 12 and/or another radio network node. The table may be a beam-to-beam table and/or a position-to-MRS table.

Action 404. The second radio network node 13 may determine that the active set of beams is relevant for the first radio network node 12. E.g. the second radio network node 13 may determine that the active set of beams is relevant for the first radio network node 12 based on the built or maintained table. In some embodiments the second radio network node 13 may provide information on its set of active beams to those neighboring radio network nodes that are potentially impacted, based on e.g. an MRS table mapping of the second radio network node. The second radio network node 13 may e.g. determine which radio network node may be impacted by the beam(s) that it is about change or get modified, e.g. add, remove or change properties of, using this table.

Action 405. The second radio network node 13 transmits an indication to the first radio network node 12. The indication indicates the determined active set of beams. The active set of beams is used in the mobility procedure of the wireless device 10. The indication may be an index of the active set of beams in a table or an explicit encoding indicating each beam in the active set of beams. The second radio network node 13 may perform the transmitting of the indication only when there is a change in the active set of beams from previously used active set of beams at the second radio network node 13, e.g. see action 402 above.

In some embodiments, the second radio network node 13 will provide information on its active set of beams upon request by another radio network node, see action 400 above. In some other embodiments, the second radio network node 13 will provide this information to all neighboring radio network nodes. In yet some other embodiments, the second radio network node 13 will provide this information only to those radio network nodes which have previously set up a 'subscription' thereof.

According to some embodiments herein the second radio network node 13 informs all relevant neighboring radio network nodes regarding which beams that are currently active in the second radio network node 13 node. This information may be used at the neighboring first radio network node 12 to optimize the mobility related measurements in this and other relevant radio network nodes.

Figure 5:
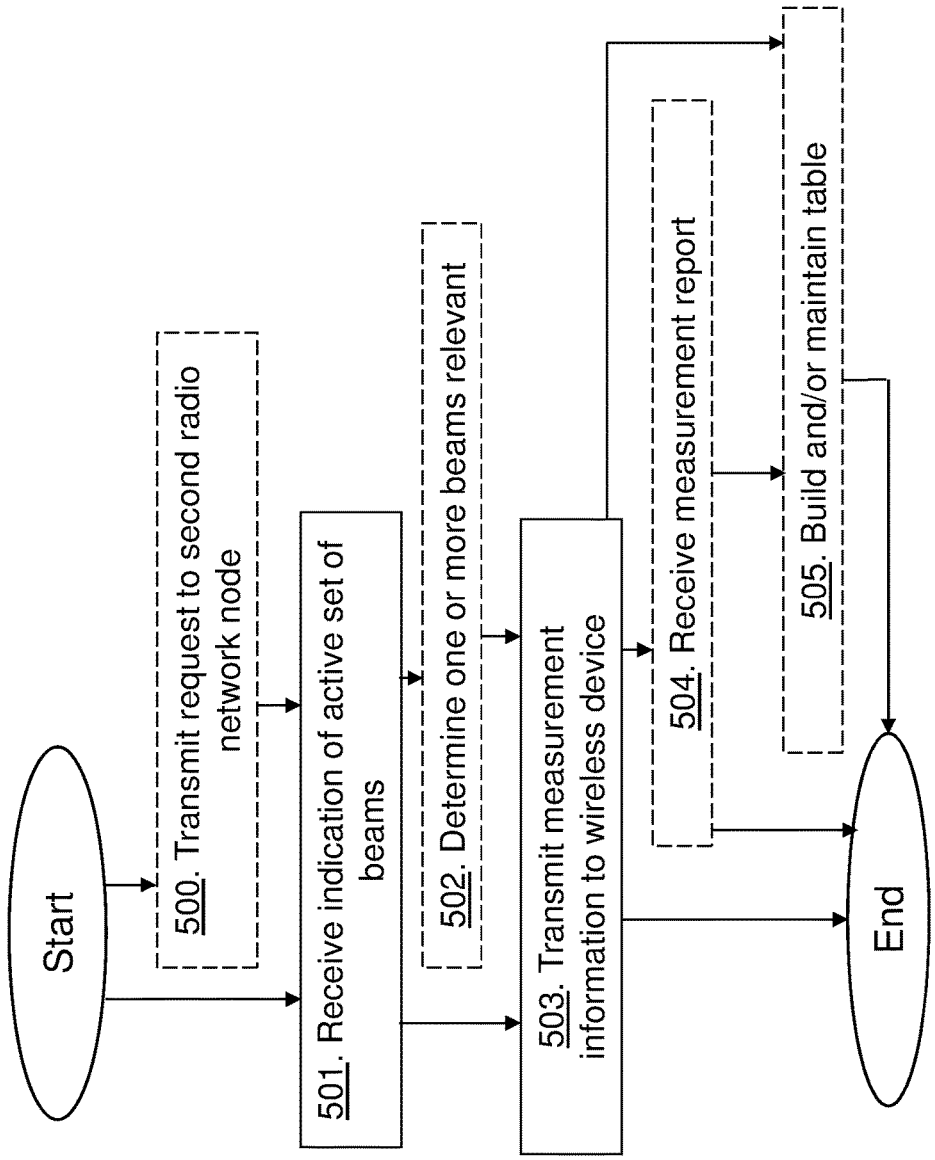
FIG. 5 is a flowchart depicting a method according to embodiments herein.

The method actions performed by the first radio network node 12 for enabling a mobility procedure of the wireless device 10 between the first radio network node 12 and the second radio network node 13 in the wireless communication network 1 according to some embodiments will now be described with reference to a flowchart depicted in FIG. 5. The actions do not have to be taken in the order stated below, but may be taken in any suitable order. Actions performed in some embodiments are marked with dashed boxes.

Action 500. The first radio network node 12 may transmit a request to the second radio network node 13 for providing the indication of active set of beams.

Action 501. The first radio network node 12 receives an indication from the second radio network node 13, which indication indicates the active set of beams used at the second radio network node 13 for connected wireless devices at the second radio network node 13. The indication may be an index of the active set of beams in a table or an explicit encoding indicating each beam in the active set of beams.

Action 502. The first radio network node 12 may determine that one or more beams of the indicated active set of beams are relevant for the wireless device 10. The may be determined based on the built or updated table, see action 505 below. This may be determined based on previous measurement reports from the wireless device 10 and or sounding reference signals from the wireless device 10.

Action 503. The first radio network node 12 transmits measurement information to the wireless device 10 indicating the one or more beams in the active set of beams to perform a measurement on, which measurement information is used in the mobility procedure of the wireless device 10. In some embodiments, the first radio network node 12 will—upon receiving information on the active set of beams from the second radio network node 13—configure the wireless devices such as the wireless device 10 the first radio network node 12 serves to measure on all beams in the active set of beams of the second radio network node 13. In some other embodiments, only a subset of the beams in the active set of beams will be subject to such measurements e.g. as determined in action 502. In some embodiments, only a subset of the wireless devices will be selected to perform such measurements. This subset of the wireless devices could e.g. be determined by letting only those wireless devices that are deemed more probable to hear the active set of beams be configured for measurement reporting. This in turn, could be decided based on e.g. the position of the wireless devices together with a current position-to-MRS table mapping of the first radio network node 12.

Action 504. The first radio network node 12 may then receive a measurement report from the wireless device 10 of the one or more beams in the active set of beams.

Active 505. The first radio network node 12 may build and/or maintain (update) a table, which table comprises relations of radio network nodes and active set of beams. E.g. the table may be built/maintained from received/sent indications of relevant beams for certain positions in the first/second radio network node. The indication may be received from within, the first radio network node 12 and/or another radio network node. In some embodiments, a position-to-MRS table mapping of the first radio network node 12 is updated towards the beams of the second radio network node 13 based on the received measurement report/s.

Figure 6:
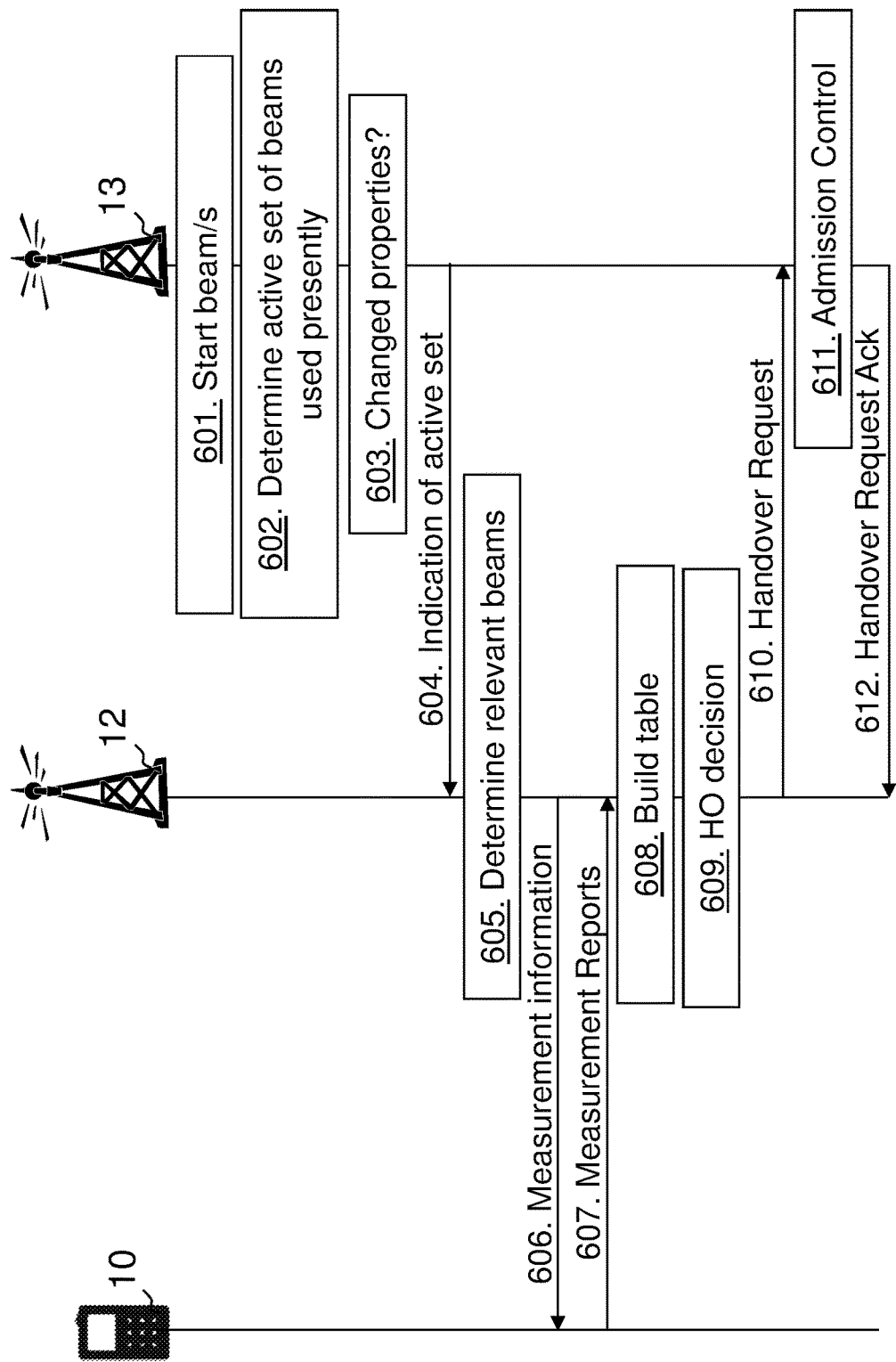
FIG. 6 is a combined signalling scheme and flowchart depicting a method according to embodiments herein.

FIG. 6 is a combined signaling scheme and flowchart according to some embodiments herein. The actions may be taken in any suitable order.

Action 601. Wireless devices get connected to the second radio network node 13 and the second radio network node 13 starts one or more beams for wireless devices such as for the second wireless device 15.

Action 602. The second radio network node 13 determines an active set of beams for connected wireless devices, i.e. determines which beams are used presently.

Action 603. The second radio network node 13 may determine whether properties of the active set of beams has changed from previously used active set of beams and/or changed from previously reported, to the first radio network node 12, active set of beams.

Action 604. The second radio network node 13 transmits an indication to the first radio network node 12, which indication indicates the determined active set of beams. This active set of beams is used at the first radio network node 12 in the mobility procedure of the wireless device 10.

Action 605. The first radio network node 12 may then determine from the indicated active set of beams which are relevant for the wireless device 10.

Action 606. The first radio network node 12 sends measurement information for enabling measurements at the wireless device 10, e.g. measurement information indicated the determined relevant beams.

Action 607. The wireless device 10 reports back to the first radio network node 12 with measurement reports of the determined relevant beams. The wireless device 10 may also send measurement reports of served beam/s of the first radio network node 12.

Action 608. The first radio network node 12 may build, or update/maintain, a table comprising relations between radio network nodes and beams. E.g. the table may be a position-MRS table, which is a table indicating a position within the first service area 11 of the first radio network node 12 mapped to MRS of the second radio network node 13, which MRS is a reference signal indicating a beam.

Action 609. The first radio network node 12 may then perform the mobility procedure, e.g. make a HO decision based on the received measurement reports.

Action 610. In case a HO is decided, the first radio network node 12 may transmit a handover request to the second radio network node 13.

Action 611. The second radio network node 13 may then perform an admission control for the wireless device 10.

Action 612. In case the admission control is successful, the second radio network node 13 sends a handover request Ack to the first radio network node 12. In some embodiments, the second radio network node 13 will provide information on its active set of beams periodically. In some other embodiments, the second radio network node 13 will provide this information only when there is a change in the said active set. In some embodiments, only the delta relative a given baseline set, which has been communicated previously, is encoded in the exchanged message with the first radio network node 12 whereas in some other embodiments the explicit active set of beams is encoded.

Information may be e.g. exchanged over backhaul links directly between the radio network nodes, e.g. via X2 or similar, or relayed via the CN, e.g. via S1 or similar, e.g. using a layer protocol as Radio Resource Control (RRC) protocol. In some embodiments, this information is used as input also for Operation and Maintenance (O&M) or self-organizing network (SON) purposes, in order to provide a relevant picture of the beam/mobility status of the wireless communication network, e.g. the built table may be transmitted to an O&M node.

Figure 7:
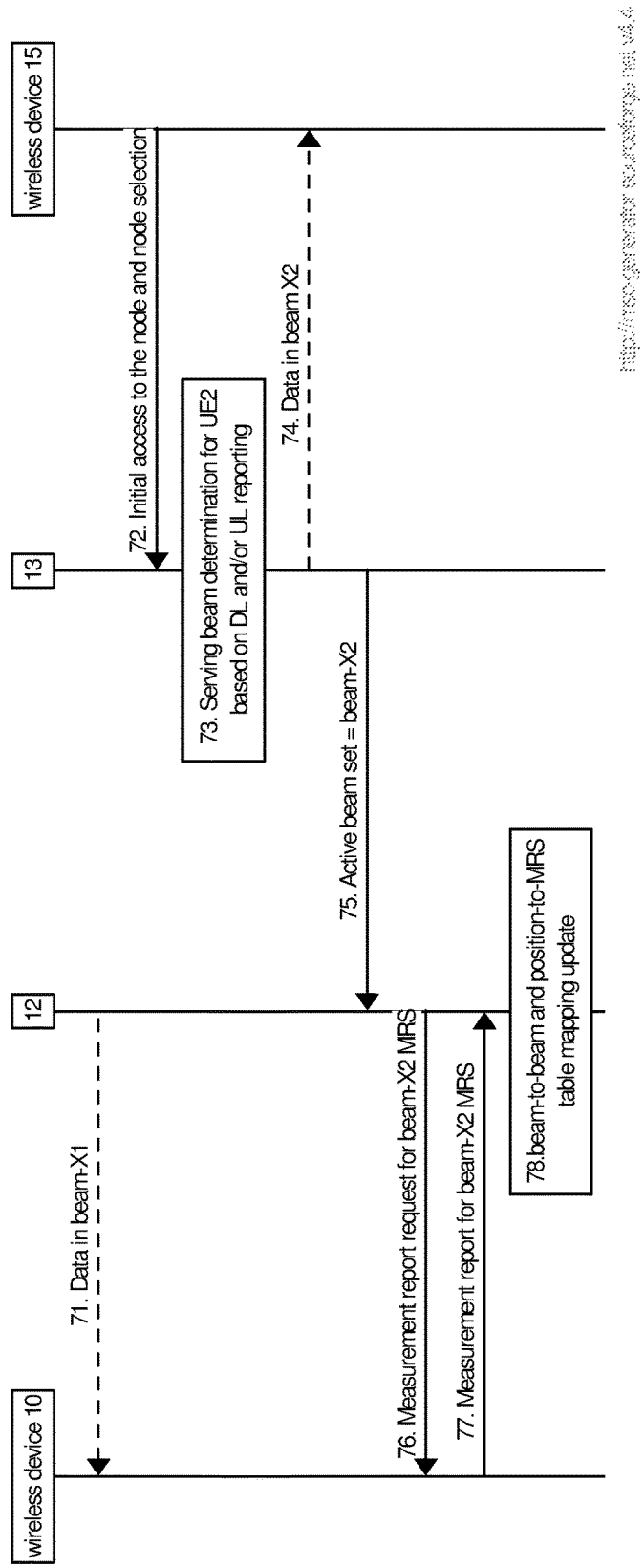
FIG. 7 is a combined signalling scheme and flowchart depicting a method according to embodiments herein.

One example of exchanging information of active set of beams resulting in a pro-active neighboring MRS related measurement is shown in FIG. 7. Dashed lines are used for data transmissions to wireless devices.

Action 71. The first radio network node 12 transmits data in a beam 'X1' to the wireless device 10.

Action 72. The second wireless device 15, also denoted as UE2, performs an initial access procedure and selects the second radio network node 13 to connect to. Hence, the second wireless device 15 performs an initial access to the node and node selection.

Action 73. The second radio network node 13 determines a serving beam 'X2' for the second wireless device 15 based on UL and/or DL reporting from the second wireless device 15. The second radio network node 13 performs a serving beam determination for the UE2 based on DL and/or UL reporting.

Action 74. The second radio network node 13 may then transmit data in the serving beam 'X2' to the second wireless device 15.

Action 75. The second radio network node 13 then determines the active set of beams, being the serving beam X2, and transmits an indication of the active set of beams to the first radio network node 12. E.g. the second radio network node 13 may send active beam set=beam-X2 to the first radio network node 12.

Action 76. The first radio network node 12 may then transmit a measurement report request for e.g. beam-X2 MRS to the wireless device 10.

Action 77. The wireless device 10 may then transmit a measurement report for beam-X2 MRS to the first radio network node 12.

Action 78. The first radio network node 12 may then perform a beam-to-beam and position-to-MRS table mapping update based on the received measurement report.

The first radio network node 12 may additionally determine whether to e.g. HO the wireless device 10 or not based on the received measurement report.

Figure 8:
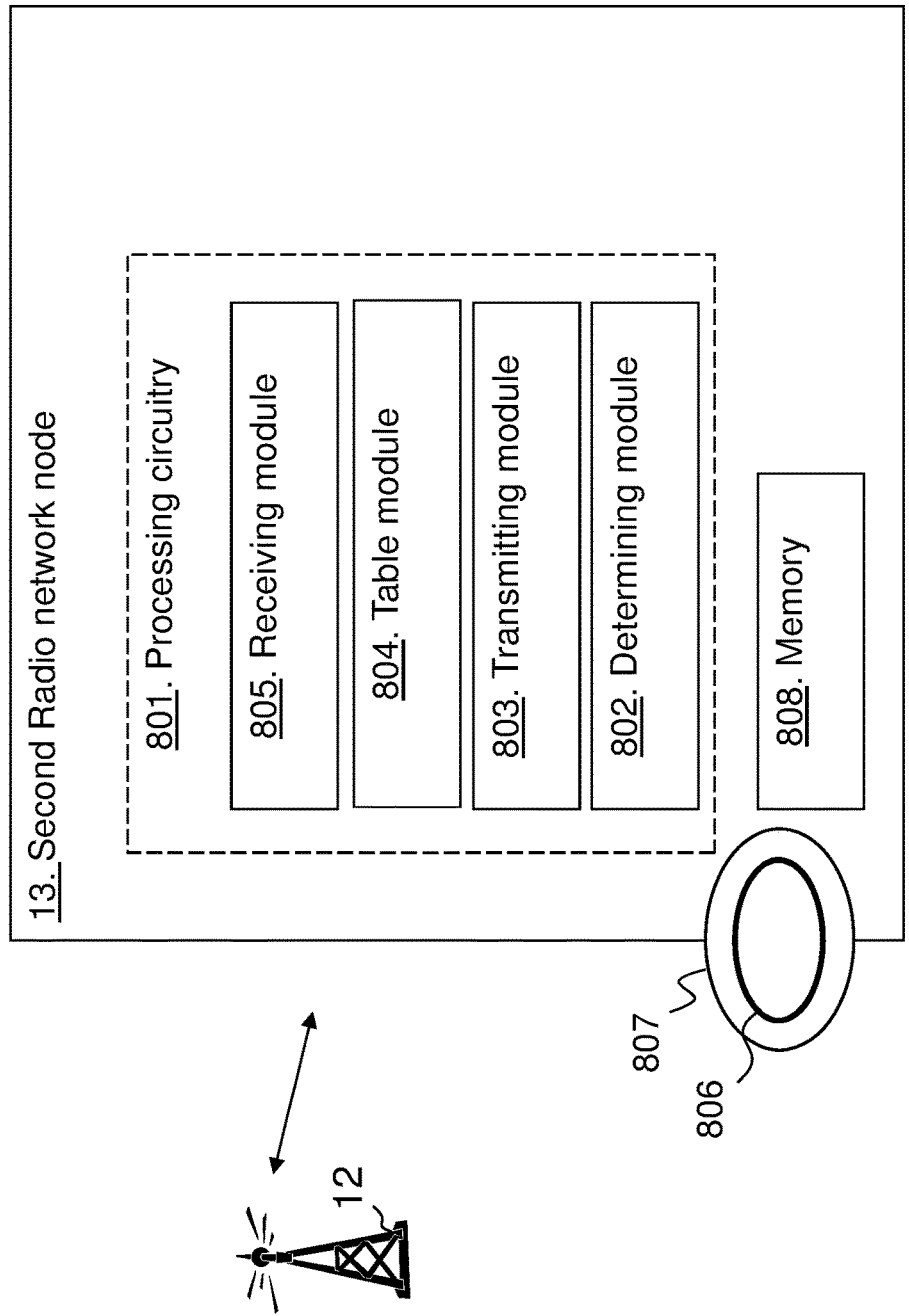
FIG. 8 is a block diagram depicting a second radio network node according to embodiments herein.

In order to perform some methods herein a second radio network node is provided. FIG. 8 is a block diagram depicting the second radio network node 13 for enabling a mobility procedure of the wireless device 10 between the first radio network node 12 and the second radio network node 13 in the wireless communication network 1. The second radio network node 13 may comprise processing circuitry 801 configured to perform the methods herein.

The second radio network node 13 is configured to determine an active set of beams used at the second radio network node 13 for connected wireless devices. The second radio network node 13 may comprise a determining module 802. The processing circuitry 801 and/or the determining module 802 may be configured to determine an active set of beams used at the second radio network node 13 for connected wireless devices.

The second radio network node 13 is configured to transmit the indication to the first radio network node 12, which indication indicates the determined active set of beams and which active set of beams is used in the mobility procedure of the wireless device 10. The indication may be an index of the active set of beams in a table or an explicit encoding indicating each beam in the active set of beams. The second radio network node 13 may be configured to transmit the indication only when there is a change in the active set of beams from previously used active set of beams at the second radio network node 13.

The second radio network node 13 may comprise a transmitting module 803. The processing circuitry 801 and/or the transmitting module 803 may be configured to transmit the indication to the first radio network node 12, which indication indicates the determined active set of beams and which active set of beams is used in the mobility procedure of the wireless device 10. The processing circuitry 801 and/or the transmitting module 803 may be configured to transmit the indication only when there is a change in the active set of beams from previously used active set of beams at the second radio network node 13.

The second radio network node 13 may be configured to determine that the active set of beams has changed when there is a change in a property of any of the beams. The processing circuitry 801 and/or the determining module 802 may be configured to determine that the active set of beams has changed when there is a change in a property of any of the beams.

Furthermore, the second radio network node 13 may be configured to determine that the active set of beams is relevant for the first radio network node 12. The processing circuitry 801 and/or the determining module 802 may be configured to determine that the active set of beams is relevant for the first radio network node 12.

In addition, the second radio network node 13 may be configured to build and/or maintain a table, which table comprises relations of radio network nodes and active set of beams. The second radio network node 13 may comprise a table module 804. The processing circuitry 801 and/or the table module 804 may be configured to build and/or maintain a table, which table comprises relations of radio network nodes and active set of beams. E.g. the table may be updated based on received measurement reports from the wireless device 10 and/or from the first radio network node 12.

The second radio network node 13 may be configured to determine that the active set of beams is relevant for the first radio network node 12 based on the built and/or maintained table. The processing circuitry 801 and/or the determining module 802 may be configured to determine that the active set of beams is relevant for the first radio network node 12 based on the built and/or maintained table.

The second radio network node 13 may be configured to receive a request from the first radio network node 12 for providing the indication of active set of beams. The second radio network node 13 may comprise a receiving module 805. The processing circuitry 801 and/or the receiving module 805 may be configured to receive a request from the first radio network node 12 for providing the indication of active set of beams.

The methods according to the embodiments described herein for the second radio network node 13 are respectively implemented by means of e.g. a computer program 806 or a computer program product, comprising instructions, i.e., software code portions, which, when executed on at least one processor, cause the at least one processor to carry out the actions described herein, as performed by the second radio network node 13. The computer program 806 may be stored on a computer-readable storage medium 807, e.g. a disc or similar. The computer-readable storage medium 807, having stored thereon the computer program, may comprise the instructions which, when executed on at least one processor, cause the at least one processor to carry out the actions described herein, as performed by the second radio network node 13. In some embodiments, the computer-readable storage medium may be a non-transitory computer-readable storage medium.

The second radio network node 13 further comprises a memory 808. The memory comprises one or more units to be used to store data on, such as beams, reference signals, table, positions, properties of beams, signal strengths, applications to perform the methods disclosed herein when being executed, and similar.

Figure 9:
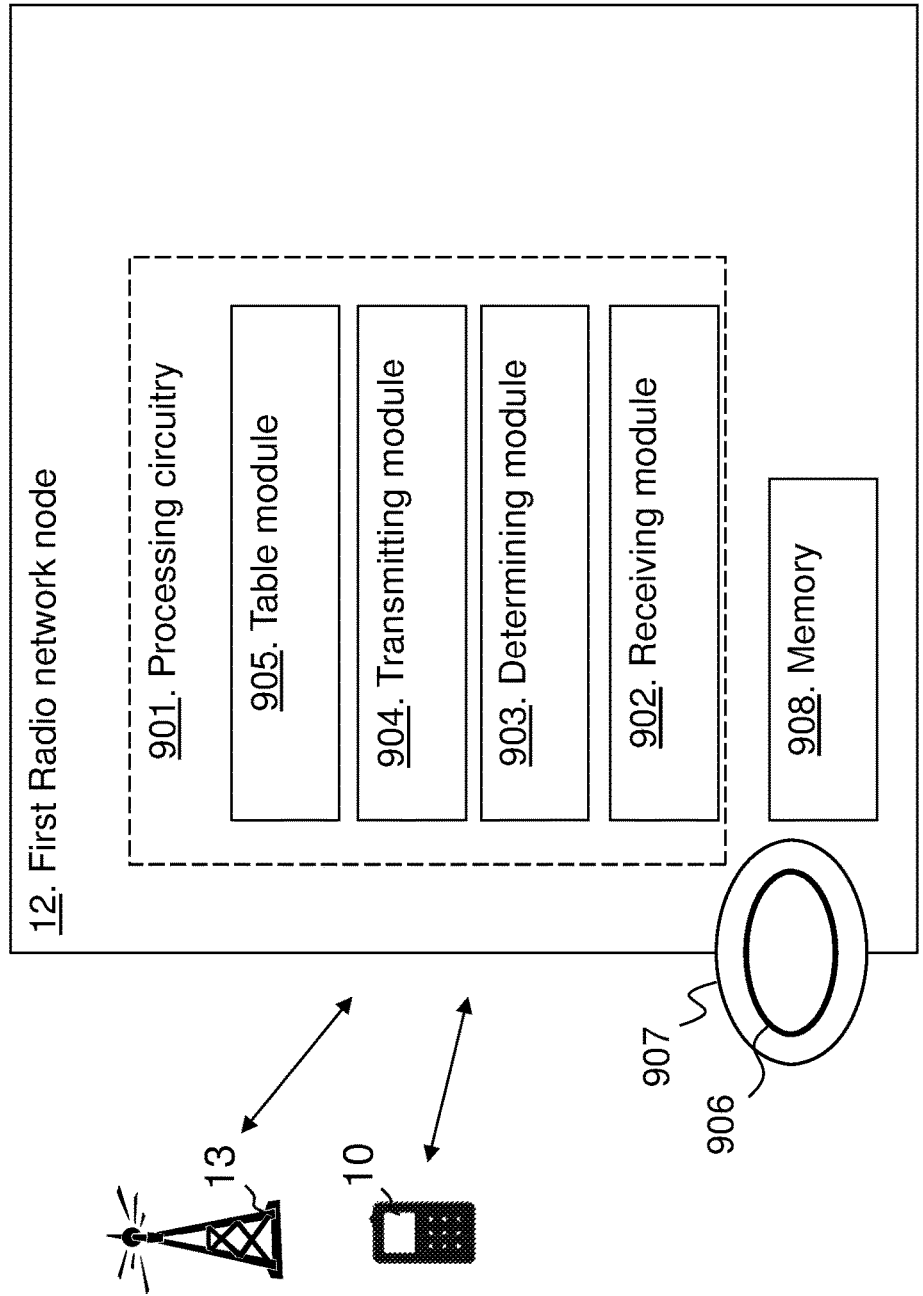
FIG. 9 is a block diagram depicting a first radio network node according to embodiments herein.

In order to perform some methods herein a first radio network node is provided. FIG. 9 is a block diagram depicting the first radio network node 12 for enabling a mobility procedure of the wireless device 10 between the first radio network node 12 and the second radio network node 13 in the wireless communication network 1. The first radio network node 12 may comprise processing circuitry 901 configured to perform the methods herein.

The first radio network node 12 is configured to receive the indication from the second radio network node 13, which indication indicates an active set of beams used at the second radio network node 13 for connected wireless devices at the second radio network node 13. The indication may be an index of the active set of beams in a table or an explicit encoding indicating each beam in the active set of beams. The first radio network node 12 may comprise a receiving module 902. The processing circuitry 901 and/or the receiving module 902 may be configured to receive the indication from the second radio network node 13, which indication indicates an active set of beams used at the second radio network node 13 for connected wireless devices at the second radio network node 13.

The first radio network node 12 may be configured to determine that the one or more beams of the indicated active set of beams are relevant for the wireless device 10. The first radio network node 12 may comprise a determining module 903. The processing circuitry 901 and/or the determining module 903 may be configured to determine that the one or more beams of the indicated active set of beams are relevant for the wireless device 10.

The first radio network node 12 is configured to transmit measurement information to the wireless device 10 indicating the one or more beams in the active set of beams to perform a measurement on, which measurement information is used in the mobility procedure of the wireless device 10. The first radio network node 12 may comprise a transmitting module 904. The processing circuitry 901 and/or the transmitting module 904 may be configured to transmit measurement information to the wireless device 10 indicating the one or more beams in the active set of beams to perform a measurement on, which measurement information is used in the mobility procedure of the wireless device 10.

The first radio network node 12 may be configured to receive a measurement report from the wireless device 10 of the one or more beams in the active set of beams. The processing circuitry 901 and/or the receiving module 902 may be configured to receive a measurement report from the wireless device 10 of the one or more beams in the active set of beams.

The first radio network node 12 may be configured to build and/or maintain a table, which table comprises relations of radio network nodes and beams. The first radio network node 12 may comprise a table module 905. The processing circuitry 901 and/or the table module 905 may be configured to build and/or maintain a table, which table comprises relations of radio network nodes and beams. E.g. the table may be updated based on received measurement reports from the wireless device 10.

The first radio network node 12 may be configured to determine that the one or more beams of the indicated active set of beams are relevant for the wireless device 10 based on the built or updated table. The processing circuitry 901 and/or the determining module 903 may be configured to determine that the one or more beams of the indicated active set of beams are relevant for the wireless device 10 based on the built or updated table.

The first radio network node 12 may be configured to transmit a request to the second radio network node 13 for providing the indication of active set of beams. The processing circuitry 901 and/or the transmitting module 904 may be configured to transmit the request to the second radio network node 13 for providing the indication of active set of beams.

The methods according to the embodiments described herein for the first radio network node 12 are respectively implemented by means of e.g. a computer program 906 or a computer program product, comprising instructions, i.e., software code portions, which, when executed on at least one processor, cause the at least one processor to carry out the actions described herein, as performed by the first radio network node 12. The computer program 906 may be stored on a computer-readable storage medium 907, e.g. a disc or similar. The computer-readable storage medium 907, having stored thereon the computer program, may comprise the instructions which, when executed on at least one processor, cause the at least one processor to carry out the actions described herein, as performed by the first radio network node 12. In some embodiments, the computer-readable storage medium may be a non-transitory computer-readable storage medium.

The first radio network node 12 further comprises a memory 908. The memory comprises one or more units to be used to store data on, such as beams, reference signals, table, positions, properties of beams, signal strengths, applications to perform the methods disclosed herein when being executed, and similar.

As will be readily understood by those familiar with communications design, that functions means or modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a radio network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

It will be appreciated that the foregoing description and the accompanying drawings represent non-limiting examples of the methods and apparatus taught herein. As such, the inventive apparatus and techniques taught herein are not limited by the foregoing description and accompanying drawings. Instead, the embodiments herein are limited only by the following claims and their legal equivalents.

The invention claimed is:

1. A method performed by a second radio network node for enabling a mobility procedure of a wireless device between a first radio network node and the second radio network node in a wireless communication network, the method comprising:
   determining an active set of beams used at the second radio network node for connected wireless devices; and
   transmitting an indication to the first radio network node, which indication indicates the determined active set of beams and which active set of beams is used in the mobility procedure of the wireless device, wherein the transmitting is performed only when there is a change in the active set of beams from previously used active set of beams at the second radio network node.

2. The method according to claim 1, further comprising determining that the active set of beams is relevant for the first radio network node.

3. The method according to claim 1, further comprising maintaining a table comprising relations of radio network nodes and active set of beams, and wherein the table maps a position within a first service area of the first radio network node to one or more beams.

4. The method according to claim 3, wherein determining that the active set of beams is relevant for the first radio network node is determined based on the table.

5. The method according to claim 1, wherein the indication is an index indicating the active set of beams in a table, or an explicit encoding indicating each beam in the active set of beams.

6. The method according to claim 1, further comprising determining that the active set of beams has changed when there is a change in a property of any of the beams.

7. A method performed by a first radio network node for enabling a mobility procedure of a wireless device between the first radio network node and a second radio network node in a wireless communication network, the method comprising:
   receiving an indication from the second radio network node, which indication indicates an active set of beams used at the second radio network node for connected wireless devices at the second radio network node and is transmitted by the second radio network node only when there is a change in the active set of beams from a previously used active set of beams at the second radio network node; and
   transmitting measurement information to the wireless device indicating one or more beams in the active set of beams to perform a measurement on, which measurement information is used in the mobility procedure of the wireless device;
   receiving a measurement report from the wireless device, for the one or more beams in the active set of beams; and
   maintaining a table comprising relations of radio network nodes and beams, taking into account the received measurement report, wherein the table maps a position within a first service area of the first radio network node to one or more beams.

8. The method according to claim 7, further comprising determining that the one or more beams of the indicated active set of beams are relevant for the wireless device.

9. The method according to claim 8, wherein the determining that the one or more beams are relevant for the wireless device is based on the table.

10. The method according to claim 7, wherein the indication is an index indicating the active set of beams in a table, or an explicit encoding indicating each beam in the active set of beams.

11. A second radio network node for enabling a mobility procedure of a wireless device between a first radio network node and the second radio network node in a wireless communication network, the second radio network node comprising:
   communication interface circuitry; and
   processing circuitry configured to:
      determine an active set of beams used at the second radio network node for connected wireless devices; and
      transmit, via the communication interface circuitry, an indication to the first radio network node, which indication indicates the determined active set of beams and which active set of beams is used in the mobility procedure of the wireless device, and being configured to transmit the indication only when there is a change in the active set of beams from previously used active set of beams at the second radio network node.

12. A first radio network node for enabling a mobility procedure of a wireless device between the first radio network node and a second radio network node in a wireless communication network; the first radio network node comprising:
   communication interface circuitry configured to communicate with a second radio network node and the wireless communication device; and
   processing circuitry operatively associated with the communication interface circuitry and configured to:
      receive an indication from the second radio network node, which indication indicates an active set of beams used at the second radio network node for connected wireless devices at the second radio network node, the second radio network node transmitting the indication only when there is a change in the active set of beams from previously used active set of beams at the second radio network node;
      transmit measurement information to the wireless device indicating one or more beams in the active set of beams to perform a measurement on, which measurement information is used in the mobility procedure of the wireless device;
      receive a measurement report from the wireless device of the one or more beams in the active set of beams; and
      maintain a table based on the received measurement report from the wireless device, the table comprising relations of radio network nodes and beams, wherein the table is mapping a position within a first service area of the first radio network node to one or more beams.

13. A wireless device for enabling a mobility procedure of the wireless device between a first radio network node and a second radio network node in a wireless communication network, the wireless device comprising:
   communication interface circuitry; and
   processing circuitry configured to:
      receive, via the communication interface circuitry, measurement information from the first radio network node that is sent only when there is a change in an active set of beams from a previously used active set of beams at the second radio network node, the measurement information indicating one or more beams in the active set of beams to perform a measurement on, which measurement information is used in the mobility procedure of the wireless device; and transmit measurement report of the one or more beams in the active set of beams, for use in maintaining a table at the first radio network node, wherein the table maps a position within a first service area of the first radio network node to one or more beams.

14. A method performed by a wireless device for enabling a mobility procedure of the wireless device between a first radio network node and a second radio network node in a wireless communication network, the method comprising:

receiving measurement information sent from the first radio network node only when there is a change in an active set of beams from previously used active set of beams at the second radio network node, indicating one or more beams in the active set of beams to perform a measurement on, which measurement information is used in the mobility procedure of the wireless device; and transmitting a measurement report of the one or more beams in the active set of beams, for use in maintaining a table at the first radio network node, wherein the table maps a position within a first service area of the first radio network node to one or more beams.

* * * * *